United States Patent

[11] 3,612,247

| [72] | Inventor | Walter B. Pipp |
| | | Glen Ellyn, Ill. |
| [21] | Appl. No. | 846,891 |
| [22] | Filed | Aug. 1, 1969 |
| [45] | Patented | Oct. 12, 1971 |
| [73] | Assignee | American Chain Cable Company, Inc. |
| | | New York, N.Y. |

[54] ACCUMULATING ROLLER CONVEYOR SYSTEM
21 Claims, 13 Drawing Figs.
[52] U.S. Cl. .................................................. 198/37, 198/127
[51] Int. Cl. ............................................... B65g 43/08
[50] Field of Search ........................................... 198/127, 34, 160, 37

[56] References Cited
UNITED STATES PATENTS

| 3,156,345 | 11/1964 | Good | 198/160 X |
| 3,225,893 | 12/1965 | Currie | 198/127 |
| 3,425,736 | 2/1969 | Benjamin | 294/64 |
| 3,512,624 | 5/1970 | Crane | 198/37 X |

FOREIGN PATENTS

| 193,995 | 9/1967 | U.S.S.R. | 198/127 |

Primary Examiner—Gerald M. Forlenza
Assistant Examiner—George F. Abraham
Attorney—Barnes, Kisselle, Raisch & Choate ABSTRACT: An accumulating roller conveyor system comprising a plurality of longitudinally spaced transversely extending article-carrying rollers which are yieldingly biased upwardly out of contact with a drivebelt. When articles engage the rollers, the weight of the articles forces the rollers downwardly into driving contact with the drivebelt. Sensing devices at longitudinally spaced points sense the interruption of movement of the articles along the article-carrying rollers and causes expansible chambers to be inflated to hold the rollers out of engagement with the drivebelt.

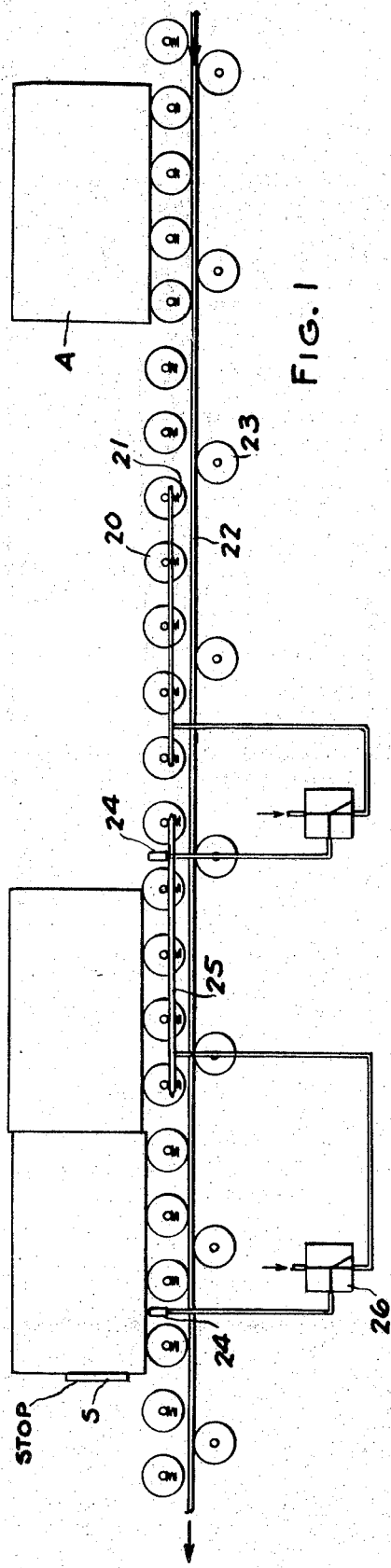
FIG. 1
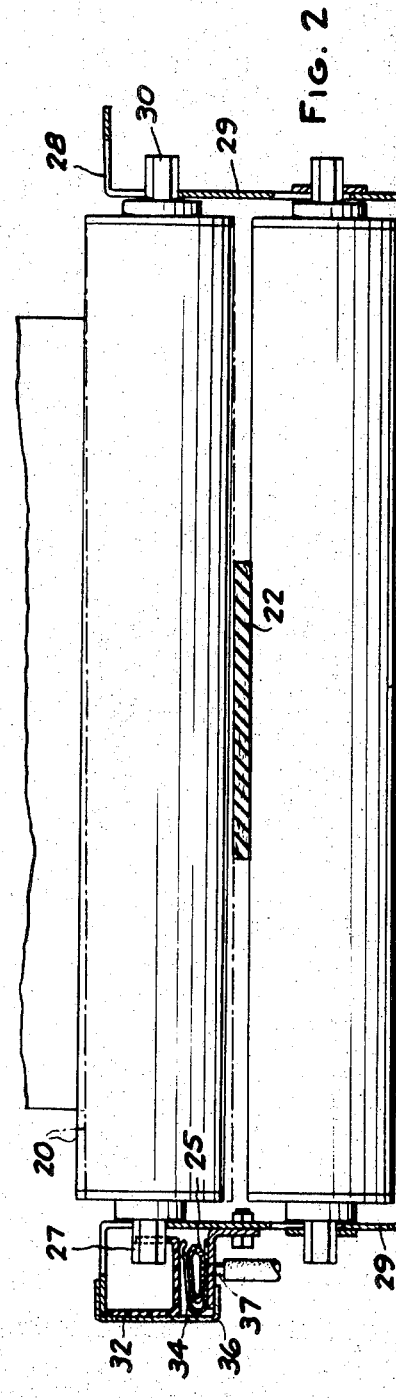
FIG. 2
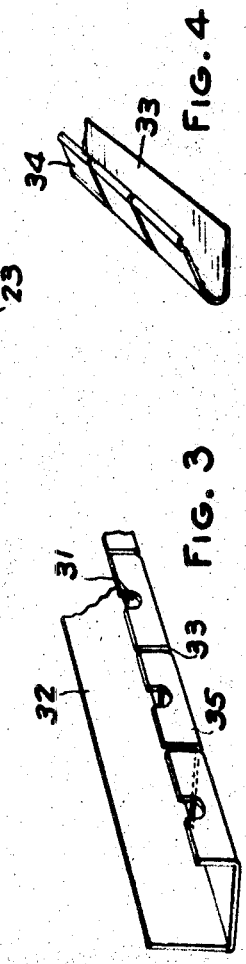
FIG. 3
FIG. 4
INVENTOR.
WALTER B. PIPP
BY
Barnes, Kisselle, Raisch & Choate
ATTORNEYS

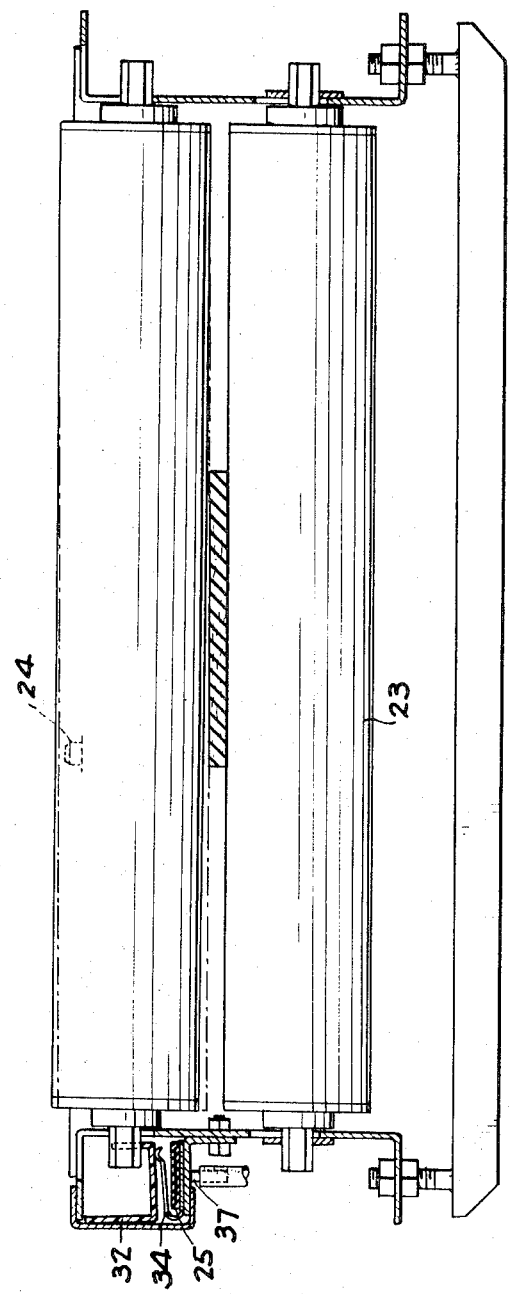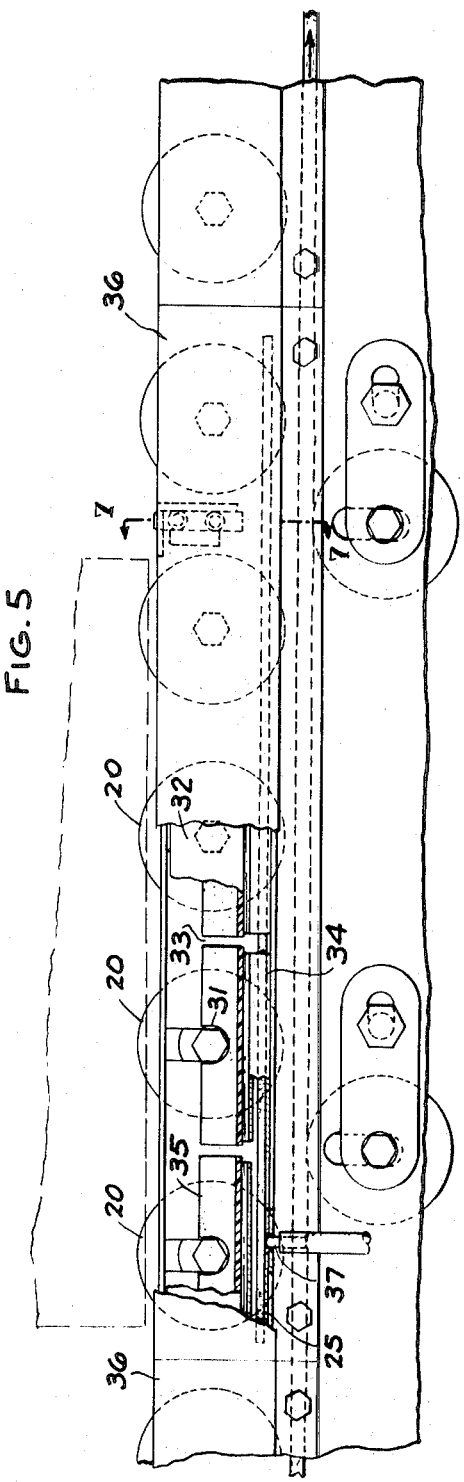

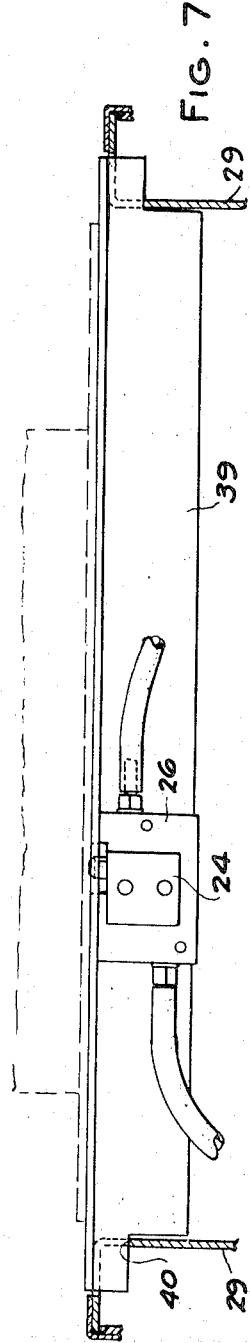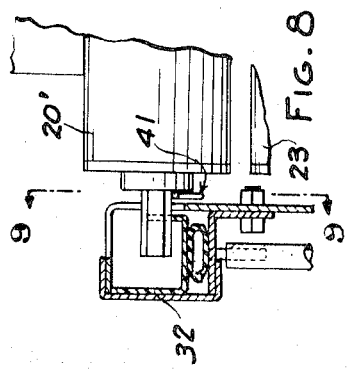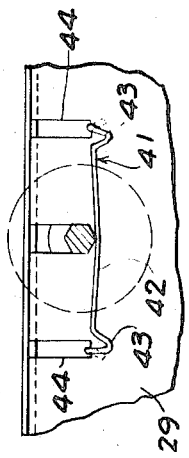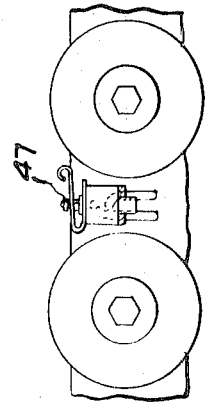

3,612,247

ACCUMULATING ROLLER CONVEYOR SYSTEM

This invention relates to accumulating roller conveyors.

A common type of conveyor for moving articles is a roller conveyor wherein a plurality of longitudinally spaced rollers are provided and driven so that they successively transport articles from one point to another. It has heretofore been suggested that the interruption of the drive to such rollers is desirable where articles are to be accumulated on the rollers.

Among the objects of the invention are to provide an accumulating roller conveyor system wherein efficient accumulation may be achieved; wherein the wear and maintenance on the system is maintained at a minimum; and wherein the means for achieving accumulation are simple in construction.

SUMMARY OF THE INVENTION

An accumulating roller conveyor system comprising a plurality of longitudinally spaced transversely extending article-carrying rollers which are yieldingly biased upwardly out of contact with continuously driven driving means. When articles engage the rollers, the weight of the articles forces the rollers downward into driving contact with the driving means. Sensing devices at longitudinally spaced points sense the interruption of movement of the articles along the rollers and cause expansible chambers to be inflated to hold the rollers out of engagement with the driving means.

DESCRIPTION OF THE DRAWINGS

FIG. 1 is a diagrammatic view of an accumulating roller conveyor system embodying the invention.

FIG. 2 is a transverse sectional view of a system embodying the invention.

FIG. 3 is a fragmentary perspective view of a part of the system.

FIG. 4 is a fragmentary perspective view of another part of the system.

FIG. 5 is a view similar to FIG. 2 showing the parts in a different operative position.

FIG. 6 is a fragmentary longitudinal view showing a portion of the system.

FIG. 7 is a sectional view taken along the line 7—7 in FIG. 6.

FIG. 8 is a fragmentary sectional view of a modified form of system.

FIG. 9 is a fragmentary side elevational view of the system shown in FIG. 8.

FIG. 10 is a fragmentary sectional view of another modified form of system.

FIG. 11 is a fragmentary longitudinal view of a further modified form of the system.

DESCRIPTION

Figure 12:
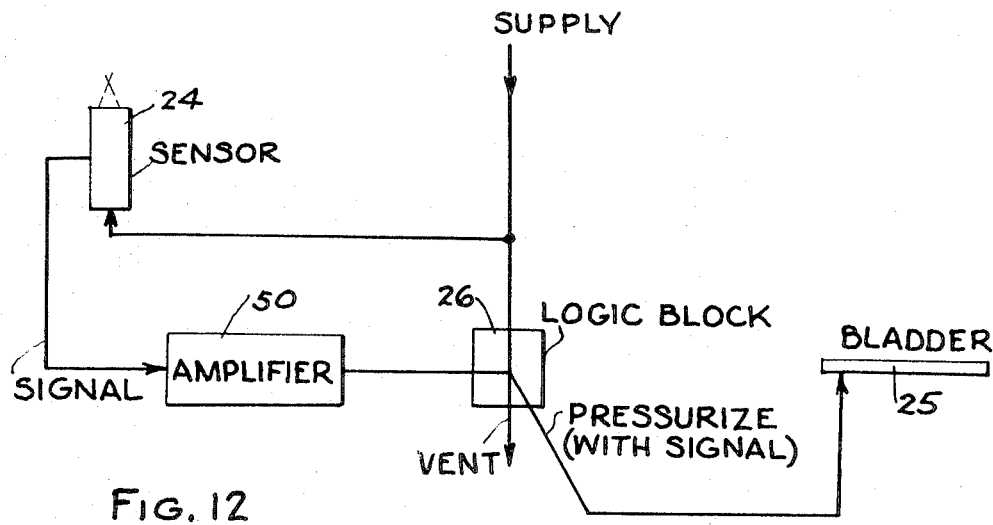
FIG. 12 is a schematic diagram of one type of control system.

Referring to FIG. 1, the accumulating roller conveyor system made in accordance with the invention comprises a plurality of longitudinally spaced, transversely extending article-carrying rollers 20 each of which is biased upwardly by biasing means shown in FIG. 1 as springs 21 at one end thereof. In this fashion, the rollers 20 are kept out of contact with a continuously driven drivebelt 22 that is supported by idler rolls 23.

As articles A engage the rollers 20, the weight of the articles overcomes the force of the biasing means 21 to force the rollers 20 into driving engagement with the drivebelt 22 thereby moving the articles along the conveyor.

Sensing means 24 are provided at longitudinally spaced points along the conveyor to sense the presence of an article interrupted in its movement on the conveyor, as for engagement by means of a stop S. The rollers 20 are provided in groups along the conveyor and each group is adapted to be held upwardly, when the article is interrupted, by inflating an expansible chamber means 25 herein shown as a flexible-walled bladder.

The bladder 25 is normally uninflated permitting downward movement of the rollers 20 into engagement with the drivebelt 22. However, in the event of interruption of the movement of articles A over a sensing device 24, a fluidic switch 26 is actuated to direct air to the bladder 25 controlled by the sensing device 24 and thereby either hold the rollers controlled thereby out of engagement with the drivebelt or if an article is present on the rollers, force the rollers 20 upwardly out of contact with the drivebelt 22.

A specific embodiment of the system shown in FIG. 1 is shown in the apparatus of FIGS. 2-7. Referring to FIGS. 2 and 5, rollers 20 include a shaft 27 that projects outwardly from the ends and is retained in the open-ended slots 28 on the upper end of frame members 29 that extend longitudinally. One end 30 of shaft 27 rests in the bottom of one slot 28 while the other end of shaft 27 is received in a slot 31 in one leg of a plastic retainer 32 that is generally U-shaped. Retainer 32 is formed with slots 33 thereby segregating the portions of the retainer 32 into segments 35 which support the ends of the rollers. A V-shaped spring member 33 made of spring material and provided with a plurality of fingers 34 in one leg is positioned beneath the retainer 32 with a finger 34 provided below each segment 35 of the retainer. In this fashion, one end of the roller 20 is biased upwardly holding the roller out of contact with the belt 22.

The retainer 32 and spring member 33 are supported by a two-piece bracket 36 mounted on the side of one frame member 29.

The length of each member 32 and spring 33 is such that a group of rollers are supported by each retainer 32 and spring member 33. A longitudinally extending bladder 25 is provided between the fingers 34 of the spring member 33 and the base thereof and includes a passage or fitment 37 that extends downwardly through an opening in the bracket 36 through which air can be supplied to the bladder or permitted to leave the bladder.

As shown in FIG. 5, the idler rollers 23 are rotatably supported beneath drivebelt 22 in the longitudinally frame members 29.

As shown in FIG. 7, the fluidic switch 26 and nozzle 24 are mounted on a transverse bracket 39 that extends between frame members 29 and is supported in the upper ends of slots 40.

One form of control system for the conveyor system may be of the type shown in FIG. 12. The sensor or nozzle 24 projects an inverted cone jet. The pressure under or inside the cone is constant. When an object intersects the cone, some of the air which creates the side of the cone is forced down toward the large or lower end of the inverted cone through the passage to produce a signal that is amplified by an amplifier 50. This operates the fluidic switch 26 which controls the bladder 25. A combined sensor, amplifier and switch are commercially available as, for example, the pneumatic proximity sensor-amplifier sold by The General Electric Company under the designation Model PS 11 BA.

Figure 13:
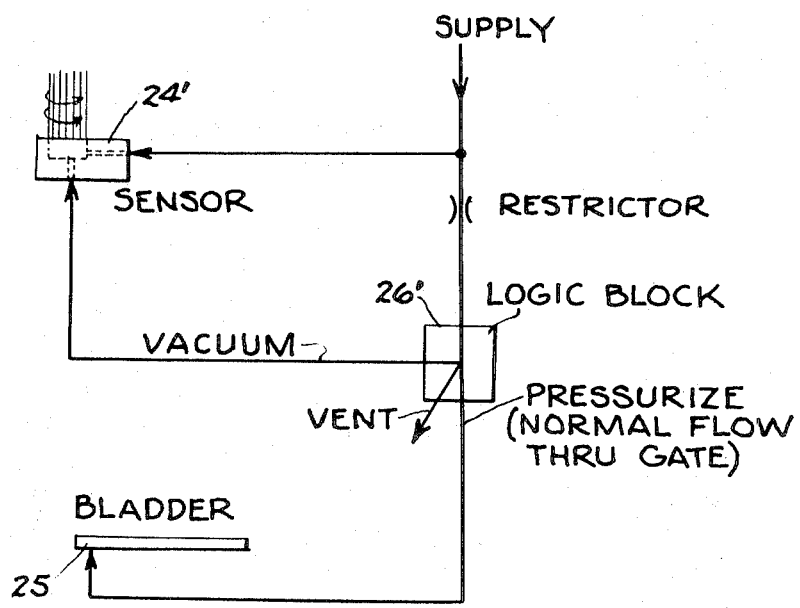
FIG. 13 is a schematic diagram of another type of control system.

Another type of control system is shown in FIG. 13 wherein the sensor 24' produces a vortex flow of air by directing air tangentially into a cylindrical chamber that has an open upper end. This creates a partial vacuum into the center of the chamber. An opening in the center of the chamber is connected to the vent of the gate or fluidic switch 26'. The vacuum in this line holds the flow through the gate 26' in the vent leg. If the flow from the sensor 24' is interrupted, the vacuum in the center is destroyed and the flow through the switch gate 26' reverts to its normal state and the bladder 25 inflates. A combined sensor, amplifier and switch of the type shown in FIG. 13 are commercially available as, for example, is presently sold by Corning Glass Works, Corning, New York.

In the form of the invention shown in FIG. 8, each roller 20' is biased upwardly at one end by a spring 41 comprising a wire that has a central portion 42 and end portions 43 the latter of which are hooked into slots 44 in the upper ends of the frame members 29'. The retainer 32 and associated structure are identical to the form shown in FIGS. 2–7, the bladder acting between bracket 36 and the segments 35 of retainer 32.

In the form of the invention shown in FIG. 10, rollers 20a are supported at one end by a single spring device 45 without the provision of a retainer, the spring device having slots 46 for supporting the end of the roller.

In the form of the invention shown in FIG. 11, a direct contact sensing device in the form of a pressure switch 47 is provided which upon physical contact with the article causes air to be directed to the bladder 25 controlled thereby.

I claim:
1. In a conveyor,
    a plurality of longitudinally spaced transversely extending article-supporting rollers,
    drive means beneath the rollers for engaging the rollers to rotate them and thereby move articles supported thereby,
    means normally biasing one end of said rollers upwardly away from said drive means whereby said rollers are normally not rotated but may be urged downwardly by an article supported thereon into engagement with the drive means,
    expansible chamber means operable upon application of fluid thereto to prevent the rollers from moving toward the drive means or to move the rollers upwardly out of engagement with the drive means if an article is held thereon,
    sensing means in the path of the articles for determining the presence of an article interrupted in its movement on the rollers,
    and means operable by said sensing means for applying fluid to said expansible chamber means when an article is present and interrupted in its movement on said rollers.

2. The combination set forth in claim 1 wherein said biasing means comprises a spring engaging one end of each of said rollers.

3. The combination set forth in claim 1 wherein said biasing means comprises a yieldable plastic element urging one end of said rollers upwardly.

4. The combination set forth in claim 1 wherein said expansible chamber means comprises an elastic-walled hollow element positioned adjacent one end of the rollers which is expandable on application of fluid thereon and is operable to engage said one end of said rollers to bias said one end upwardly upon expansion.

5. The combination set forth in claim 1 wherein said drive means comprises a longitudinally extending belt maintained in predetermined vertically disposed position with respect to said rollers,
    and means for driving said belt.

6. The combination set forth in claim 1 wherein the other end of each said roller is supported for rotation and is normally in a vertically disposed position lower than said one end of each said roller.

7. The combination set forth in claim 1 wherein said sensing means comprises a member positioned in the path of said articles and adapted to engage said articles,
    and a valve operable by said member for applying fluid to said expansible means.

8. The combination set forth in claim 1 wherein said sensing means comprises a member engageable by an article,
    and means operable by said member for applying fluid to said expansible chamber means.

9. The combination set forth in claim 1 wherein said sensing means comprises a noncontacting sensing device adapted to be actuated by an article overlying said device.

10. The combination set forth in claim 9 wherein said last-mentioned means comprises a nozzle for directing fluid upwardly in the path of an article,
    and means operable by interruption of flow of the nozzle for actuating said expansible chamber means.

11. The combination set forth in claim 10 wherein said last-mentioned means comprises a fluidic switch.

12. In a conveyor,
    a plurality of groups of longitudinally spaced transversely extending article-supporting rollers,
    drive means beneath the rollers for engaging the rollers to rotate them and thereby move articles supported thereby,
    means normally biasing at least one end of said rollers upwardly away from said drive means whereby said rollers are normally not rotated but are urged downwardly by an article supported thereon into engagement with the drive means,
    expansible chamber means operable upon application of fluid thereto to prevent the rollers from moving toward the drive means or to move the rollers upwardly out of engagement with the drive means if an article is held thereon,
    said expansible chamber means comprising an elastic-walled hollow element positioned adjacent one end of said group of rollers and which is expandable on application of fluid thereon and is operable to engage said one end of said group of rollers to bias said one end upwardly upon expansion,
    and sensing means in the path of the articles for determining the presence of an article interrupted in its movement on the rollers,
    and means operable by said sensing means for applying fluid to said expansible chamber means when an article is present and interrupted in its movement on said rollers.

13. The combination set forth in claim 12 wherein said biasing means comprises a spring engaging one end of each of said rollers.

14. The combination set forth in claim 12 wherein said biasing means comprises a yieldable plastic element urging one end of said rollers upwardly.

15. The combination set forth in claim 12 wherein said drive means comprises a longitudinally extending belt maintained in predetermined vertically disposed position with respect to said rollers,
    and means for driving said belt.

16. The combination set forth in claim 12 wherein the other end of each said roller is supported for rotation and is normally in a vertically disposed position lower than said one end of each said roller.

17. The combination set forth in claim 12 wherein said sensing means comprises a member positioned in the path of said articles and adapted to engage said articles,
    and a valve operable by said member for applying fluid to said expansible chamber.

18. The combination set forth in claim 12 wherein said sensing means comprises a member engageable by an article,
    and means operable by said member for applying fluid to said expansible chamber means.

19. The combination set forth in claim 12 wherein said sensing means comprises a noncontacting sensing device adapted to be actuated by an article overlying said device.

20. The combination set forth in claim 19 wherein said last-mentioned means comprises a nozzle for directing fluid upwardly in the path of an article,
    and means operable by interruption of flow of the nozzle for actuating said expansible chamber means.

21. The combination set forth in claim 20 wherein said last-mentioned means comprises a fluidic switch.